(12) United States Patent
Thielicke et al.

(10) Patent No.: US 12,030,730 B2
(45) Date of Patent: Jul. 9, 2024

(54) HANDLING DEVICE WITH DEFINED IDLE CONFIGURATION

(71) Applicant: J.Schmalz GmbH, Glatten (DE)

(72) Inventors: Ernst Thielicke, Reutlingen (DE);
Steffen Beck, Egenhausen (DE);
Jonathan Kohler, Schopfloch (DE);
Hans Burt, Horb a.N. (DE); Sandro Katz, Rottenburg (DE)

(73) Assignee: J. Schmalz GmbH, Glatten (DE)

(*) Notice: Subject to any disclaimer, the term of this patent is extended or adjusted under 35 U.S.C. 154(b) by 0 days.

(21) Appl. No.: 17/721,198

(22) Filed: Apr. 14, 2022

(65) Prior Publication Data

US 2022/0332523 A1 Oct. 20, 2022

(30) Foreign Application Priority Data

Apr. 20, 2021 (DE) ...................... 10 2021 109 904.8

(51) Int. Cl.
*B65G 47/90* (2006.01)
(52) U.S. Cl.
CPC .................................... *B65G 47/90* (2013.01)
(58) Field of Classification Search
CPC .............................. B25J 19/0029; B65G 47/90
See application file for complete search history.

(56) References Cited

U.S. PATENT DOCUMENTS

| | | | |
|---|---|---|---|
| 4,887,016 A * | 12/1989 | Malick | B25J 9/1692 700/262 |
| 5,599,452 A | 2/1997 | Lingen | |
| 5,609,261 A * | 3/1997 | Hensler | B66F 11/044 212/292 |
| 2005/0193854 A1* | 9/2005 | Sanemasa | H02G 11/00 74/490.02 |
| 2009/0084927 A1* | 4/2009 | Nihei | B25J 9/08 901/50 |

(Continued)

FOREIGN PATENT DOCUMENTS

| | | | |
|---|---|---|---|
| CN | 2 01 002 931 Y | | 1/2008 |
| CN | 202825826 U | * | 3/2013 |

(Continued)

*Primary Examiner* — Saul Rodriguez
*Assistant Examiner* — Brendan P Tighe
(74) *Attorney, Agent, or Firm* — ASLAN LAW, P.C.

(57) ABSTRACT

A handling device comprising an extending support, comprising a first projection element which is arranged on the support in a rotationally fixed and/or non-displaceable manner and extends in a first projection plane transversely to the support in a first projection direction, comprising a second projection element which is connected to the first projection element via a first joint so as to be pivotable in a second projection plane, comprising a third projection element which is connected to the second projection element via a second joint so as to be pivotable in a third projection plane, wherein, along the support axis, the first projection plane overlies the second projection plane and the second projection plane overlies the third projection plane, wherein the second projection element can be pivoted under the first projection element and the third projection element can be pivoted under the second projection element and the first projection element.

14 Claims, 8 Drawing Sheets

(56) References Cited

U.S. PATENT DOCUMENTS

| | | | |
|---|---|---|---|
| 2010/0178135 A1* | 7/2010 | Laceky | H01L 21/68707 414/217 |
| 2013/0116821 A1* | 5/2013 | Joly | G05B 19/4086 700/254 |
| 2013/0260606 A1* | 10/2013 | Hahakura | H01R 13/60 439/534 |
| 2015/0127146 A1* | 5/2015 | Carlson | B25J 9/1617 700/245 |
| 2018/0009111 A1* | 1/2018 | Ho | B25J 18/04 |
| 2018/0043529 A1 | 2/2018 | Ho et al. | |
| 2018/0086489 A1 | 3/2018 | Rogers et al. | |
| 2018/0175347 A1* | 6/2018 | Ninomiya | H01M 50/103 |
| 2018/0182658 A1 | 6/2018 | Goto et al. | |
| 2018/0354136 A1 | 12/2018 | Carlisle et al. | |
| 2020/0055218 A1* | 2/2020 | Wang | B29C 45/0084 |

FOREIGN PATENT DOCUMENTS

| | | | | |
|---|---|---|---|---|
| CN | 207291307 U | * | 5/2018 | |
| CN | 108379709 A | * | 8/2018 | |
| DE | 10 06 794 A | | 4/1957 | |
| DE | 42 42 667 A1 | | 6/1994 | |
| DE | 295 08 758 U1 | | 8/1995 | |
| DE | 102004040253 A1 | * | 3/2006 | F41F 3/04 |
| DE | 10 2012 016 477 A1 | | 5/2014 | |
| EP | 0 189 356 A2 | | 7/1986 | |
| EP | 2 989 042 A1 | | 3/2016 | |
| JP | H10-187 221 A | | 7/1998 | |
| JP | 2007-98 507 A | | 4/2007 | |
| JP | 2022091213 A | * | 6/2022 | |
| KR | 20160030441 A | * | 3/2016 | |
| WO | WO 2014/174006 A1 | | 10/2014 | |
| WO | WO-2018019810 A1 | * | 2/2018 | B25J 11/0045 |

\* cited by examiner

Fig. 8

HANDLING DEVICE WITH DEFINED IDLE CONFIGURATION

CROSS-REFERENCE TO RELATED APPLICATIONS

This application claims priority to DE Patent Application No. 10 2021 109 904.8 filed on Apr. 20, 2021, the entire contents of which are hereby incorporated by reference.

DESCRIPTION

The invention relates to a handling device for handling and optionally transporting objects.

In production or logistics environments, there is often a large number of handling stations at which objects have to be moved from a storage rack onto a pallet, for example. Manually operated handling devices, which allow a high degree of flexibility when loading, can be used to move the objects. Tube lifters with suction grippers arranged at the ends of a lifting tube can be used as lifting aids. Crane-like constructions are also known. For example, a stationary lifting aid having a suspension cable which is guided along a horizontally aligned, laterally pivotable boom is known from EP289042A1. A vacuum gripper for fastening the objects to the device can be arranged on the suspension cable. The operator can manually operate the objects after picking them up to move and set them down at their destination. Industrial trucks, such as forklifts, are often used to move objects over long distances. If the objects are loaded from the industrial truck into storage areas or onto handling stations, problems can arise due to the space requirement of the handling device used or an unfavorable positioning of the handling device. In particular, considerable maneuvering effort can be required if the handling device is arranged in a stationary manner.

The object of the present invention is to provide a handling device which can be operated comfortably and moved easily and safely between different locations.

This object is achieved with a handling device that has the features of claim 1. The handling device comprises a support which extends along a vertical support axis when the handling device is operated as intended. A first projection element which is rotationally fixed and/or non-displaceable and extends in a first projection plane transversely to the support in a first projection direction is arranged on the support. The projection plane is preferably orthogonal, at an angle of 90° to the support. In particular, the first projection element can have a first end portion which screwed, welded, or connected in some other way to the support. The first projection element is preferably non-adjustable in length and/or non-telescopic. In particular, the first projection element is rigidly connected to the support.

A second projection element is mounted on the first projection element by means of a first joint so as to be pivotable in a second projection plane. The first joint is preferably designed as a first rotary joint with a single degree of freedom, said joint being rotatable about a first axis of rotation extending parallel to the support axis. The first joint may comprise ball bearings or cylindrical roller bearings. In particular, the first joint and the second projection element are arranged at a second end portion of the first projection element. The second end portion is arranged opposite the aforementioned first end portion of the first projection element. The second projection element may also have a first end portion and a second end portion, with the first end portion of the second projection element being assigned to the second end portion of the first projection element.

A third projection element is mounted on the second projection element by means of a second joint so as to be pivotable in a third projection plane. The second joint is preferably designed as a rotary joint with a single degree of freedom, said joint being rotatable about a second axis of rotation extending parallel to the support axis. The second joint can preferably comprise ball bearings or cylindrical roller bearings. In particular, the second joint and/or the third projection element are arranged at a second end portion of the second projection element. The second end portion is arranged opposite the first end portion of the second projection element. The third projection element may have a first end portion and a second end portion, with the first end portion of the third projection element being assigned to the second end portion of the second projection element.

An attachment portion for coupling a lifting and/or gripping device is provided on the third projection element. The attachment portion is preferably arranged opposite the first end portion of the third projection element.

The first joint and the second joint are formed such that, along the support axis, the first projection plane overlies the second projection plane and the second projection plane overlies the third projection plane. The first projection element, the second projection element, and the third projection element are therefore arranged in a cascade-like or descending step-like manner. In addition, the projection elements and/or the joints are designed in such a way that the first projection plane, the second projection plane, and/or the third projection plane are parallel to one another and/or that the first projection plane, the second projection plane, and/or the third projection plane each extend orthogonally to the support axis.

The joints and the projection elements are designed such that the second projection element pivots under the first projection element, and the third projection element pivots under the second projection element and under the first projection element. The first joint is preferably designed in such a way that the second projection element is pivotable by more than 360° about the first axis of rotation. The second joint is preferably designed in such a way that the third projection element is pivotable by more than 360° about the second axis of rotation. The pivoting of the projection elements allows a high degree of freedom of movement for a coupled lifting and/or gripping device. The lifting and/or gripping device can be moved in almost any way in a plane parallel to the third projection plane. Due to the rigid fastening of the first projection element to the support, easy operability of the handling device is achieved, since the range of movement of the projection elements is shifted and/or restricted in the projection direction.

A locking apparatus is preferably provided on the support and/or on the first projection element, in which apparatus the third projection element can be fixed in an idle configuration. The third projection element preferably has a locking portion assigned to the locking apparatus. The locking apparatus and the locking portion are preferably designed to be coordinated with one another and arranged in such a way that the locking portion can be fixed in the locking apparatus, as a result of which the clearly defined idle configuration for the second projection element and the third projection element is specified.

In the case of mobile handling devices with movable links, care must be taken when moving the entire handling device that the links do not protrude too far to the side or even deflect to the side. The rotationally fixed and/or non-displaceable arrangement of the first projection element and the possibility of fixing the second projection element and the third projection element by means of the locking apparatus and the locking portion enables a compact idle configuration, as explained in more detail below.

In an advantageous development of the invention, the attachment portion, and/or the locking portion is/are arranged on the second end portion of the third projection element, with the second end portion of the third projection element facing away from the second joint. When the attachment portion and the locking portion are arranged at the second end portion of the third projection element, a constant location for coupling the lifting and/or gripping device in the region of the locking apparatus is provided in the idle configuration.

Advantageously, the first projection element has a first length, the second projection element has a second length, and the third projection element has a third length. The first length corresponds to the distance between the support and the first joint in the projection direction. The second length corresponds to the distance between the first joint and the second joint. The third length corresponds to the distance between the second joint and the attachment portion. It is advantageous for the sum of the second length of the second projection element and the third length of the third projection element to be greater than the first length of the first projection element. In the idle configuration, the second joint is preferably laterally adjacent to the first projection element. It is conceivable for the second joint to be laterally adjacent to the first projection element and behind the first joint in the projection direction in the idle configuration.

In the idle configuration, when viewed in the direction of extension of the first projection element, the second joint is located between the support and the first joint, but is offset orthogonally to the projection direction adjacent to the first projection element. As a result, an arm with a considerable length and span can be achieved which, in its idle configuration, requires little space in the lateral direction. Preferably, in the idle configuration, the second projection element and the third projection element enclose an angle of between 30° and 180°, preferably an obtuse angle, with one another at the second joint.

It is advantageous for the first length of the first projection element to be longer than the second length of the second projection element and/or longer than the third length of the third projection element. In addition, it is advantageous for the third length of the third projection element to be longer than the second length of the second projection element. The shorter design of the movable projection elements ensures easy handling of the handling device by the operator.

In an advantageous development, the attachment portion and/or the locking portion of the third projection element is offset upward along the support axis. The attachment portion and/or the locking portion is preferably located in the second projection plane or above the second projection plane, i.e. on the side of the second projection plane opposite the third projection plane. A lifting and/or gripping device can thus be arranged as high as possible on the attachment portion without the installation space of the entire handling device having to be increased. If, for example, a tube lifter with a large stroke length is to be coupled to the attachment portion, it can thus be ensured that the gripping member, with a minimum length, does not hang too low in the retracted configuration of the tube lifter. In this context it is advantageous for a distance along the third projection element between the second joint and the attachment portion and/or the locking portion to be greater than or equal to the second length of the second projection element. It is thus possible for the third projection element to be pivoted completely under the second projection element, even if the attachment portion and/or the locking portion of the third projection element is offset upward along the support axis.

The support is preferably designed as a column which extends along the support axis and is in particular height-adjustable and, more particularly, telescopic. Consequently, a lifting and/or gripping device to be coupled thereto can be moved in all three spatial directions X, Y, and Z. This shows a high degree of flexibility when it comes to handling by the operator.

In a development of the invention, the handling device comprises a base housing having a central longitudinal axis that extends parallel to the projection direction and comprising a transverse axis that extends orthogonally to the central longitudinal axis and parallel to the first projection plane. The support is preferably arranged eccentrically with respect to the central longitudinal axis on the base housing, in particular in a rotationally fixed and/or non-displaceable manner. In this respect, the support is arranged on the base housing at a distance along the transverse axis from the central longitudinal axis. Accordingly, the handling device can easily be driven under and moved by an industrial truck.

It is advantageous for the locking apparatus to be arranged on a side of the support and/or of the first projection element, which side faces the central longitudinal axis. In addition, it is advantageous for both the locking apparatus and the locking portion to be arranged in the second projection plane. Consequently, it is obvious for the operator to arrange the second projection element and the third projection element between the central longitudinal axis and the first projection element in the idle configuration.

Advantageously, the locking apparatus and/or the locking portion is designed in such a way that the locking portion can be fixed in the locking apparatus along a movement path originating from the central longitudinal axis. In this respect, the lateral space requirement for pivoting the arms into the idle configuration is kept as small as possible. The operator can preferably only fix the second projection element and the third projection element in the idle configuration originating from the central longitudinal axis. In the idle position, the second joint is then preferably laterally adjacent to the first projection element, specifically on the side of the first projection element that faces the central longitudinal axis. The first projection element and the second projection element enclose an acute angle with each other at the first joint. As a result, the idle configuration is assumed without a laterally protruding interfering contour being formed. It is also conceivable for the sum of the second projection element and the third projection element to be designed to be significantly longer than the first projection element. In this case, the second joint may be positioned between the first projection element and the central longitudinal axis in the idle configuration, or between the first projection element and another longitudinal axis which extends parallel and eccentric to the central longitudinal axis with respect to the support. It is also ensured in this case that the second projection element and the third projection element do not form any laterally protruding interfering contours in the idle configuration.

In a development of the invention, the base housing has at least one tine receptacle for at least one tine of a fork of an industrial truck, the tine receptacle being designed in particular in the manner of a tine overshoe. The base housing and/or the tine receptacle is preferably designed in such a way that the industrial truck can drive under the base housing and the at least one tine can be inserted into the at least one tine receptacle. This allows the handling device to be transported easily by means of the industrial truck.

An energy source is preferably provided in the base housing, which energy source is designed in particular as a replaceable and/or rechargeable trough battery. The trough battery can be easily pushed into the base housing or removed from the base housing.

A vacuum pump can also be arranged in the base housing. The support, the first projection element, the second projection element, and the third projection element preferably have channels, in particular internal channels, for conveying media and/or data between the vacuum pump and the attachment portion. Furthermore, the support, the first projection element, the second projection element, and the third projection element can be designed as hollow profiles, with the interior cavities of the hollow profiles forming the aforementioned channels. As a result, an internal pressure control system is provided for a lifting and/or gripping device that can be coupled, and interfering contours caused by tubes are avoided.

In a further development of the invention, at least one support foot is provided on the base housing, which support foot can be adjusted parallel to the support axis into a support position which is lower along the support axis and into a release position which is higher along the support axis. In the support position, the load acting on the handling device can be guided into the ground via the at least one support foot. In the upper release position, the handling device can be moved without the at least one support foot touching the ground.

It is advantageous for the at least one support foot to be designed in such a way that the at least one support foot moves into the upper release position when the locking portion is fixed in the locking apparatus and/or when an industrial truck has driven under the handling device. It is also advantageous for the at least one support foot to be designed in such a way that the at least one support foot moves into the lower support position when the locking portion is released from the locking apparatus. A control device is preferably provided which is designed to move the support position into the upper release position and the lower support position. Accordingly, the at least one support foot can be automatically moved to the optimal position in each case. The control device can be arranged in particular in the base housing or on the attachment portion.

The handling device advantageously comprises a lifting and/or gripping device which is arranged on the attachment portion of the third projection element. The lifting and/or gripping device is preferably designed as a tube lifter, comprising a lifting tube that can be shortened by applying a vacuum, and suction gripping means arranged at the free end of the lifting tube for suctioning up an object to be lifted. The vacuum supply required for operation for the lifting tube and the suction gripping means is preferably provided through internal channels in the projection elements and in particular also through internal channels in the support.

Further details and advantageous designs of the invention can be found in the following description, with reference to which different embodiments will be described and explained in greater detail.

Figure 1:
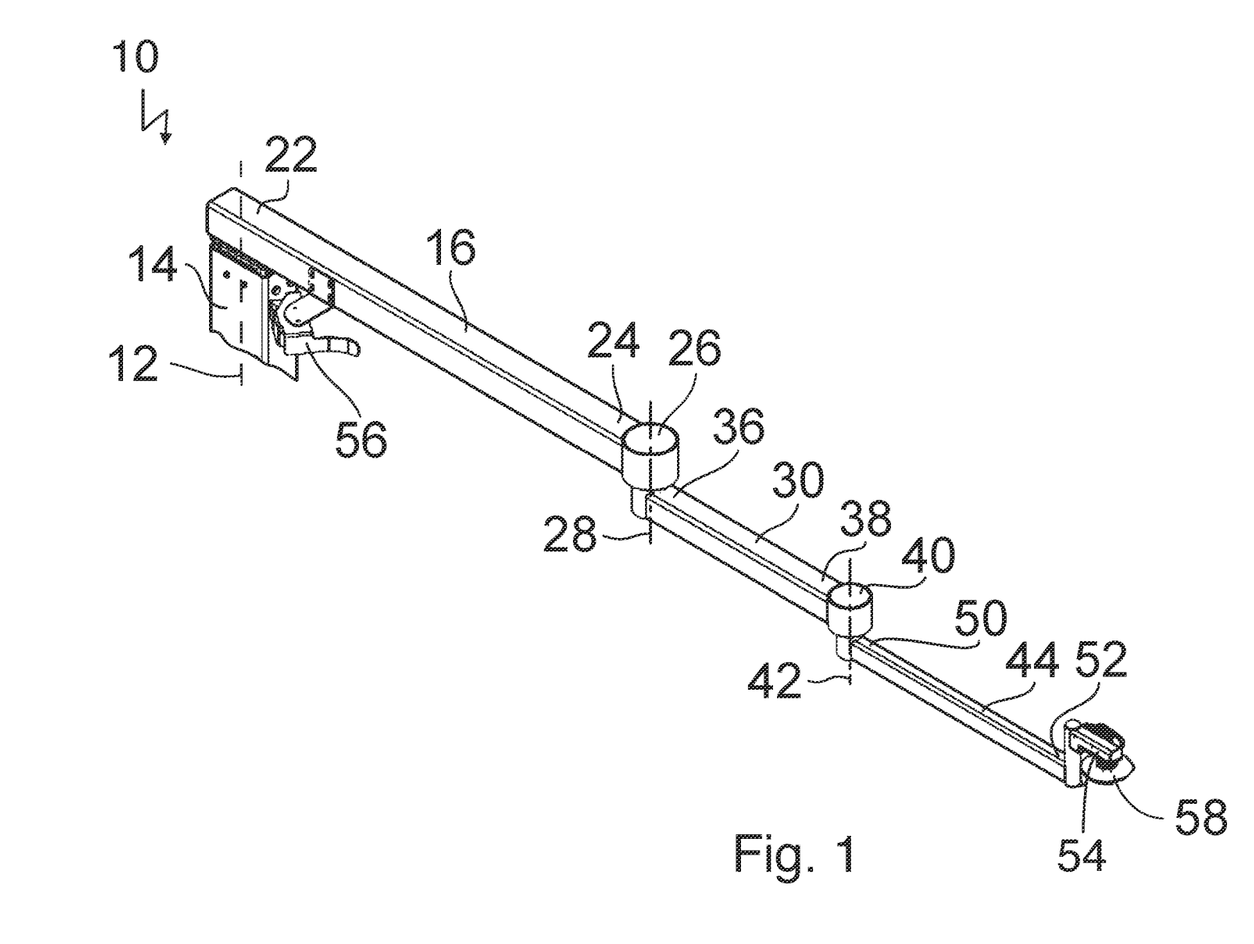
FIG. 1 is a schematic view of a handling device according to the invention having three projection elements.
Figure 2:
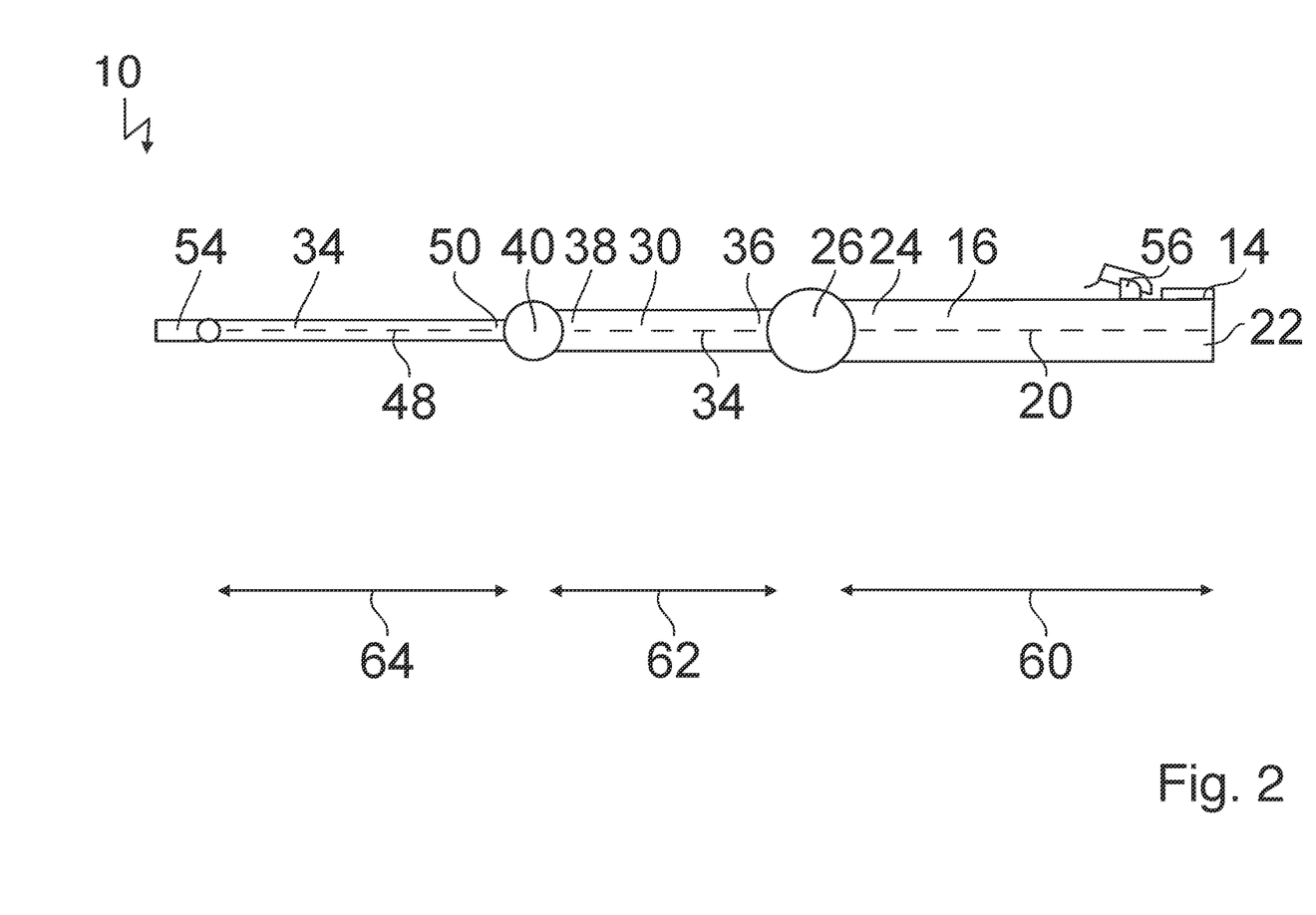
FIG. 2 is a schematic plan view of the handling device according to FIG. 1.
Figures 3A, 3B:
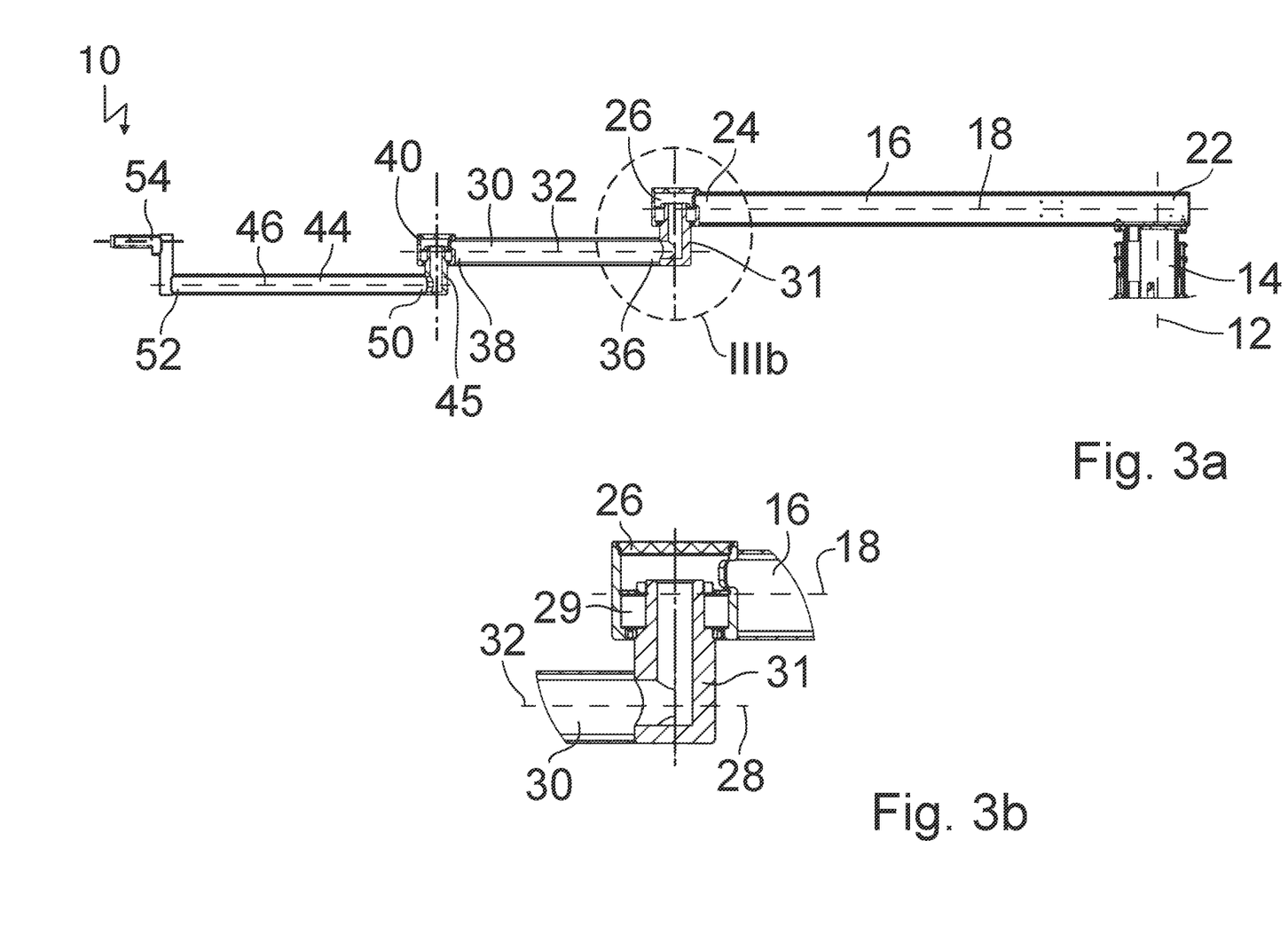
FIG. 3*a* is a schematic side view of the handling device according to FIG. 1.
FIG. 3*b* is a detailed view of detail III of FIG. 3*a*.

FIGS. 1 to 3 show a handling device 10 which comprises a support 14 which extends along a support axis 12 that is vertical when the handling device 10 is operated as intended. The support 14 is designed as a column 14 which is telescopic and thus height-adjustable. A first projection element 16 which is fastened to the support 14 in a rotationally fixed and non-displaceable manner and which extends in a first projection plane 18 in a first projection direction 20 is arranged on the support 14. The first projection plane 18 and the first projection direction 20 each extend orthogonally, at an angle of 90° to the support axis 12. The first projection element 16 has a front first end portion 22 and a rear second end portion 24. The first projection element 16 is connected to the support 14 in the front first end portion 22.

A first rotary joint 26 is arranged at the rear second end portion 24 of the first projection element 16. The rotary joint 26 can be rotated about a first axis of rotation 28, the axis of rotation 28 extending parallel to the support axis 12. The first rotary joint 28 comprises cylindrical roller bearings 29. The first rotary joint 28 can be seen in detail in FIG. 3*a*. A second projection element 30 is arranged pivotably on the first projection element 16 by means of the first rotary joint 26.

The second projection element 30 is pivotable about the axis of rotation 28. The second projection element 30 extends in a second projection plane 32 in a second projection direction 34. The second projection element 30 has a front first end portion 36 and a rear second end portion 38, the first end portion 36 being assigned to the first rotary joint 26. On the first end portion 36, the second projection element 30 has a first joint portion 31 that extends along the first axis of rotation 28, leads into the first rotary joint 26 from below, and is surrounded by the cylindrical roller bearings 29.

A second rotary joint 40 having a second axis of rotation 42 is arranged on the second end portion 38 of the second projection element 30, the second axis of rotation 42 extending parallel to the support axis 12 and to the first axis of rotation 28. The second rotary joint 40 also comprises cylindrical roller bearings 29.

A third projection element 44 is arranged pivotably on the second projection element 30 by means of the second rotary joint 40. The third projection element 44 is pivotable about the second axis of rotation 42. The third projection element 44 extends in a third projection plane 46 in a third projection direction 48. The third projection element 44 has a front first end portion 50 and a rear second end portion 52, the first end portion 50 being assigned to the second rotary joint 40. On the first end portion 50, the third projection element 44 has a second joint portion 45 that extends along the second axis of rotation 42, leads into the second rotary joint 40 from below, and is surrounded by the cylindrical roller bearings 29.

An attachment portion 54 for coupling a lifting and/or gripping device 55 is provided on the rear second end portion 52 of the third projection element 44.

The first rotary joint 26 is designed in such a way that, according to FIG. 3a, the first projection plane 18 overlies the second projection plane 32 along the support axis 12. The second rotary joint 40 is designed in such a way that the second projection plane 32 overlies the third projection plane 46 along the support axis 12. The first rotary joint 26 and the second rotary joint 40 are designed in such a way that the first projection plane 18 overlies the third projection plane 46. Furthermore, the rotary joints 26, 40 and the projection elements 16, 30, 44 are designed in such a way that the first projection plane 18, the second projection plane 32, and the third projection plane 46 each extend parallel to one another.

In particular in FIG. 3a, it can be seen that the second projection element 30 can be pivoted under the first projection element 16. Correspondingly, the third projection element 44 can be pivoted under the second projection element 30. The first rotary joint 26 and the second rotary joint 40 are designed in such a way that the second projection element 30 and the third projection element 44 are pivotable by more than 360° about the first axis of rotation 28 or the second axis of rotation 42 as often as desired.

The length ratios of the projection elements 16, 30, 44 can be seen in particular in FIG. 2. The first projection element 16 has a first length 60 measured by the distance between the support 14 and the first rotary joint 26. The second projection element 30 has a second length 62 which is measured by the distance between the first rotary joint 26 and the second rotary joint 40. The third projection element 44 has a third length 64 which is measured by the distance between the second rotary joint 40 and the attachment portion 54. The first projection element 16, the second projection element 30, and the third projection element 44 are configured such that the first length 60 of the first projection element 16 is greater than the second length 62 of the second projection element 30 and the third length 64 of the third projection element 44, such that the third length 64 of the third projection element 44 is greater than the second length 62 of the second projection element 30, and such that the sum of the second length 62 and the third length 64 is greater than the first length 60.

Figure 5:
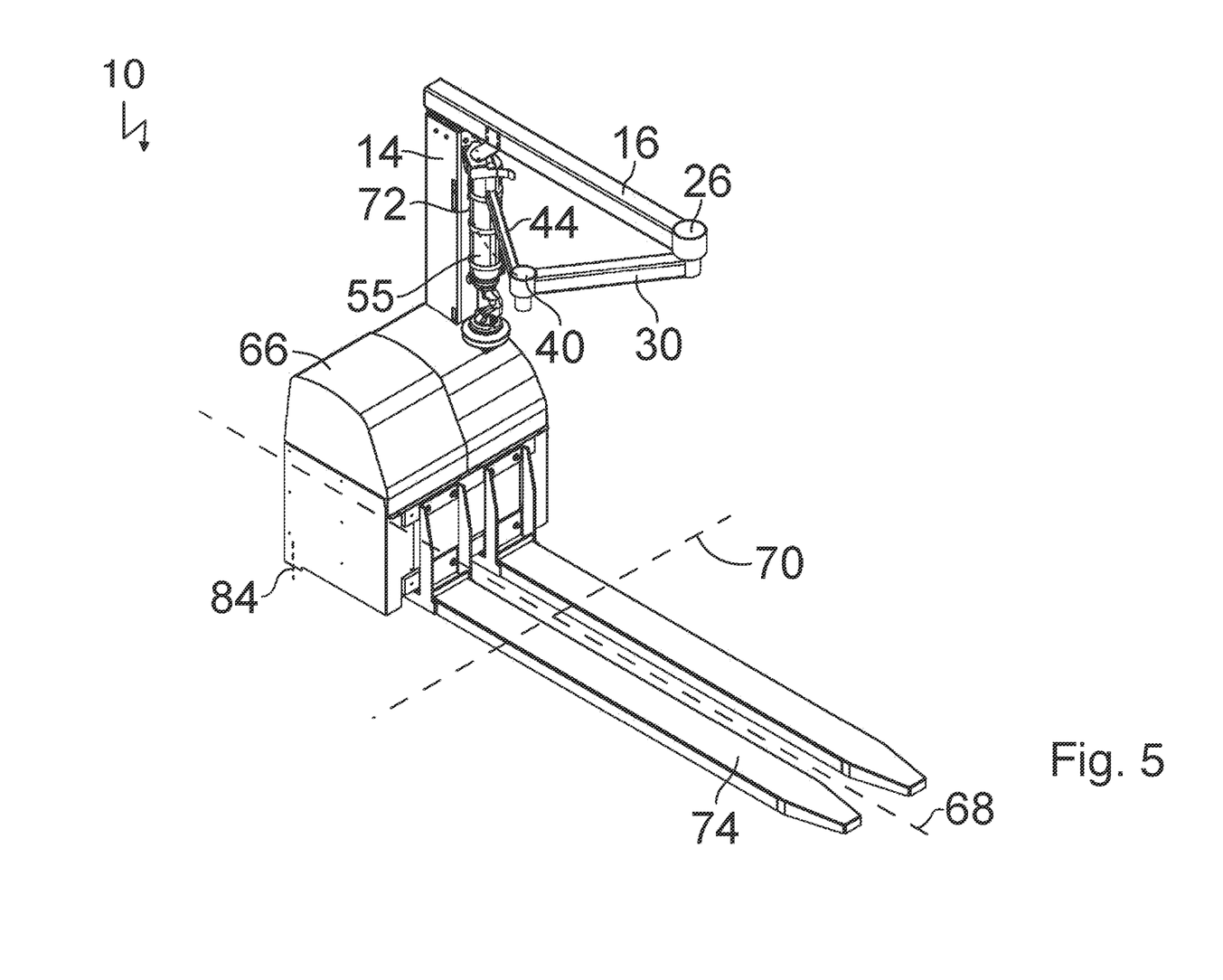
FIG. 5 is a schematic view of the handling device according to FIG. 4 with the projection elements in the idle configuration.
Figure 6:
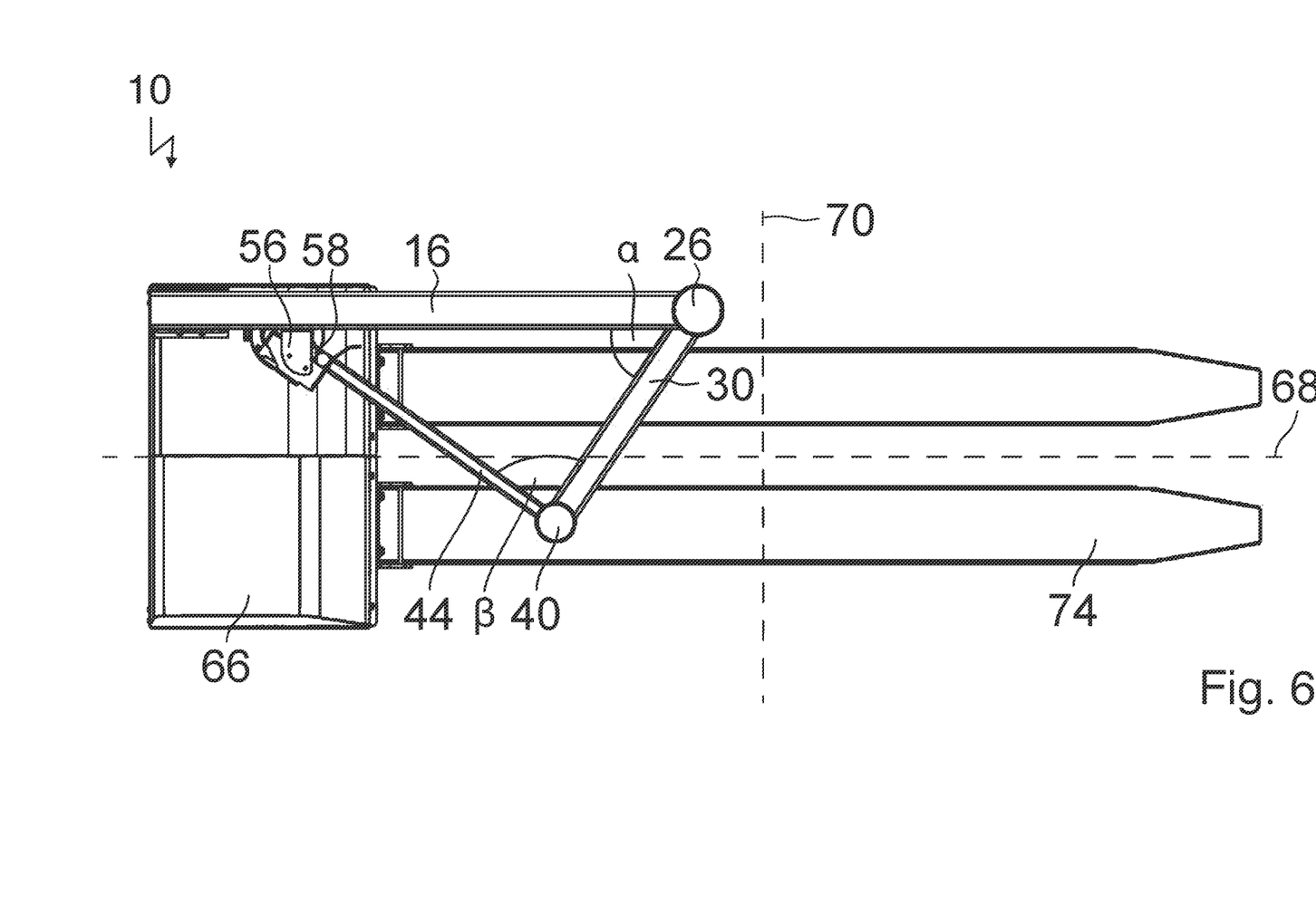
FIG. 6 is a schematic plan view of the handling device according to FIG. 4 with the projection elements in the idle configuration.
Figure 7:
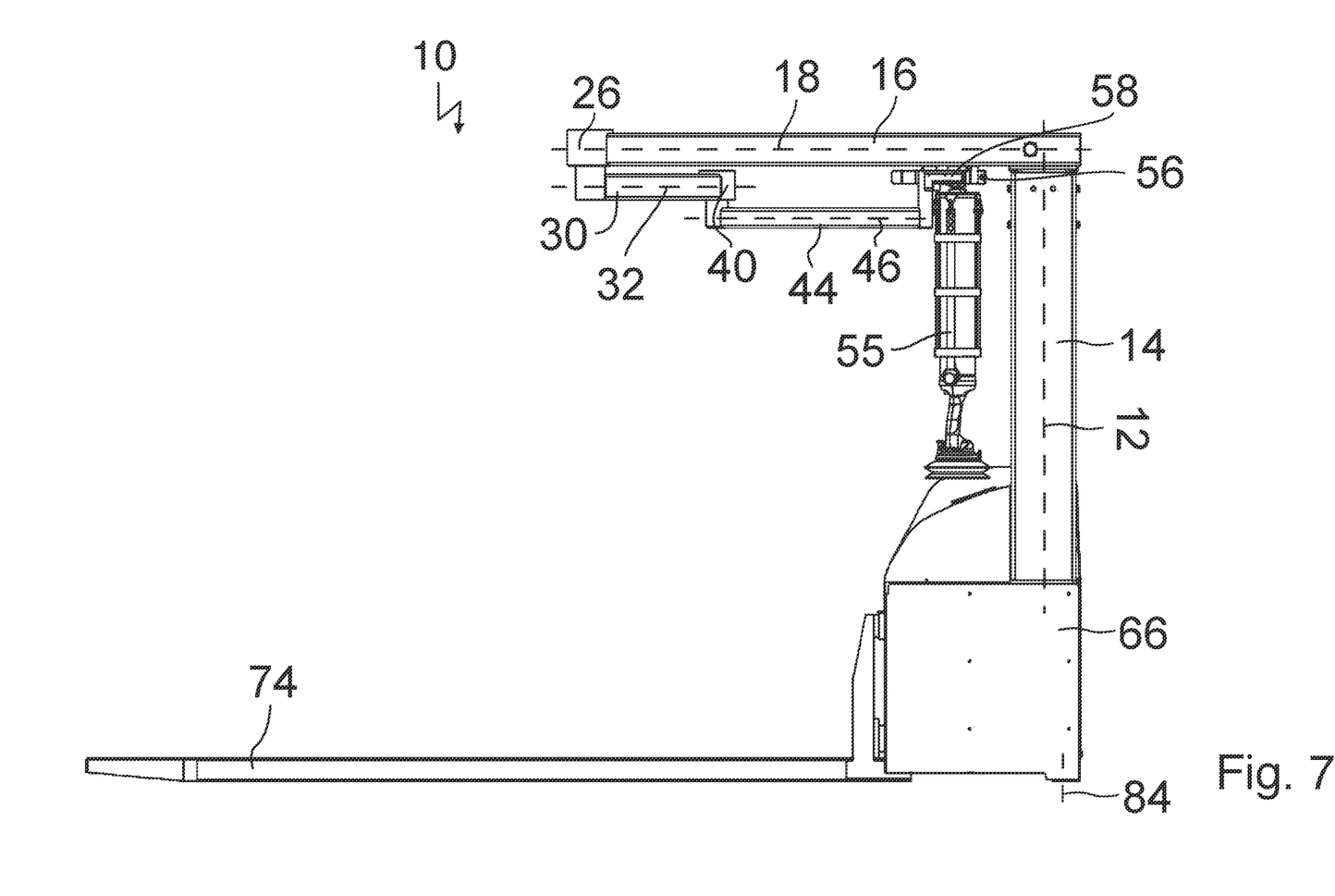
FIG. 7 is a schematic side view of the handling device according to FIG. 4 with the projection elements in the idle configuration.

A locking apparatus 56 is provided on the first projection element 16. The third projection element 44 has a locking portion 58 which is arranged at the rear second end portion 52 of the third projection element 44 and assigned to the locking apparatus 56. The locking apparatus 56 and the locking portion 58 are designed to be coordinated with one another and arranged in such a way that the locking portion 58 can be fixed in the locking apparatus 56, as a result of which a clearly defined idle configuration for the second projection element 30 and the third projection element 44 can be specified. Such an idle configuration is shown in FIGS. 5, 6 and 7.

The attachment portion 54 and the locking portion 58 are offset upward along the support axis 12. It can thus be ensured that a lifting and/or gripping device 55 to be coupled is arranged as high as possible and does not hang too low, for example in a retracted configuration. The attachment portion 54 is provided above the second projection plane 32 and below the first projection plane 46. The locking portion 58 is provided in the second projection plane 32. Since the third length 64 is greater than the second length 62, the third projection element can pivot under the second projection element 30 despite the upwardly offset attachment portion 54 and upwardly offset locking portion 58. In addition, the locking apparatus 56 is also arranged in the second projection plane 32 so that the locking portion 58 can be fixed in the locking apparatus 56.

A further embodiment of a handling device 10 according to the invention is shown in FIGS. 4 to 8, which further comprises a base housing 66. The base housing 66 has a central longitudinal axis 68 that extends parallel to the first projection direction 20 and a transverse axis 70 that extends orthogonally to the central longitudinal axis 66 and parallel to the first projection plane 18. The support 14 is arranged eccentrically with respect to the central longitudinal axis 66 on the base housing so as to be rotationally fixed and non-displaceable.

The locking apparatus 56 is arranged on a side of the first projection element 16 that faces the central longitudinal axis 68. The locking apparatus 56 and the locking portion 58 are designed in such a way that the locking portion 58 can only be fixed in the locking apparatus 56 along a movement path 72 originating from the central longitudinal axis 68.

Figure 4:
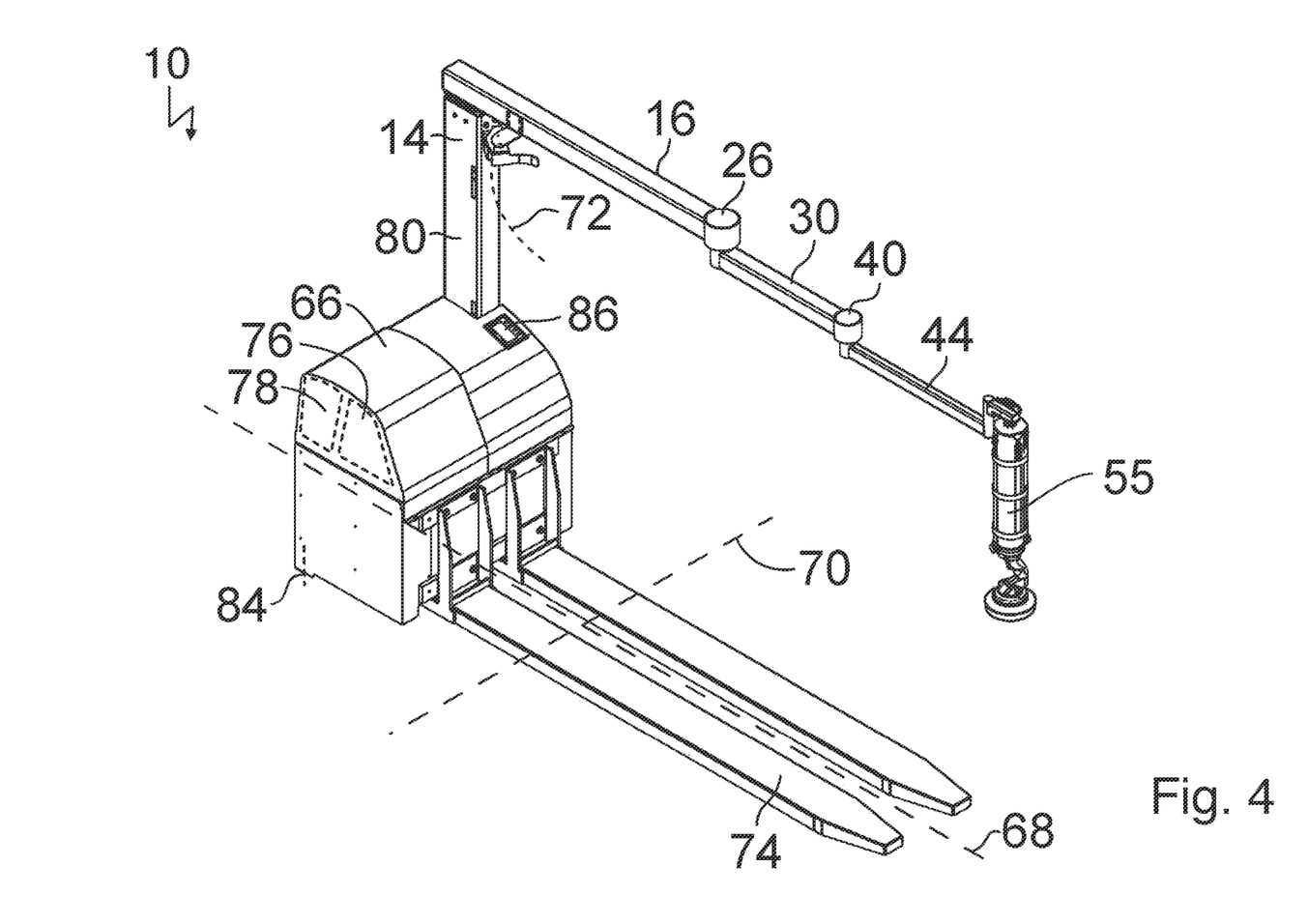
FIG. 4 is a schematic view of the handling device according to the invention according to FIG. 1 having a base housing and a lifting device, the three projection elements being fully extended.

To fix the locking portion 58 in the locking apparatus 56, both the second projection element 30 and the third projection element 44 must be pivoted clockwise out of the longitudinal configuration, which can be seen in particular in FIG. 4, so that the projection elements 30, 44 are arranged according to the idle configuration, which can be seen in FIGS. 5, 6 and 7. The second projection element 30 extends away from the first rotary joint 26, obliquely to the central longitudinal axis 68, so that, at the first rotary joint, an acute angle that is open toward the base housing 66 is enclosed by the first projection element 16 and the second projection element 30.

As a generally advantageous aspect, in the idle configuration, the first rotary joint 26 and the second rotary joint 40 are located on different sides of the central longitudinal axis 68 (cf. FIG. 6). The arm is thus folded up to save space and uses the space provided by the eccentric arrangement of the support 14.

The third projection element 44 is arranged along the transverse axis 70 between the second rotary joint 40 and the support 14. Due to the rotationally fixed arrangement of the first projection element 16 and the lengths 60, 62, 64 of the projection elements 16, 30, 44, the projection elements 30, 44 each enclose a defined angle with one another in plan view, with the first projection element 16 and the second projection element 30 enclosing an acute angle and the second projection element 30 and the third projection element 44 enclosing an obtuse angle. The projection elements 30, 44 therefore have a compact extension in the lateral direction. In this way, it can be ensured that the handling device 10 does not have any laterally protruding interfering contours when the handling device 10 is in the idle configuration.

Two tine receptacles 74 are provided on the base housing 66, each for receiving a tine of a fork of an industrial truck. The base housing 66 and the tine receptacles 74 are designed in such a way that the handling device 10 can be driven under by an industrial truck and a tine can be inserted into the tine receptacle 74 in each case. For this purpose, the base housing 66 has a recess 73 provided in the region of the floor, which corresponds at least to the width of the fork of an industrial truck. Commercially available pallets, which are also transported when the handling device 10 is transported, can be placed on the tine receptacles 74.

In order to provide energy for the handling device 10, an energy source 76 is provided in the base housing 66, which energy source is in the form of a rechargeable and replaceable trough battery. The energy source 76 can be easily inserted into the base housing 66 or removed from the base housing 66. A vacuum pump 78 is also accommodated in the base housing 66. The support 40, the first projection element 16, the second projection element 30, and the third projection element 44 are designed as hollow profiles, with the internal cavities 79 of the hollow profiles forming channels for conveying media and data between the vacuum pump 78 and the attachment portion 54. The internal pressure control system 80 formed in this way can be used to operate a vacuum-operated lifting and/or gripping device 55.

Figure 8:
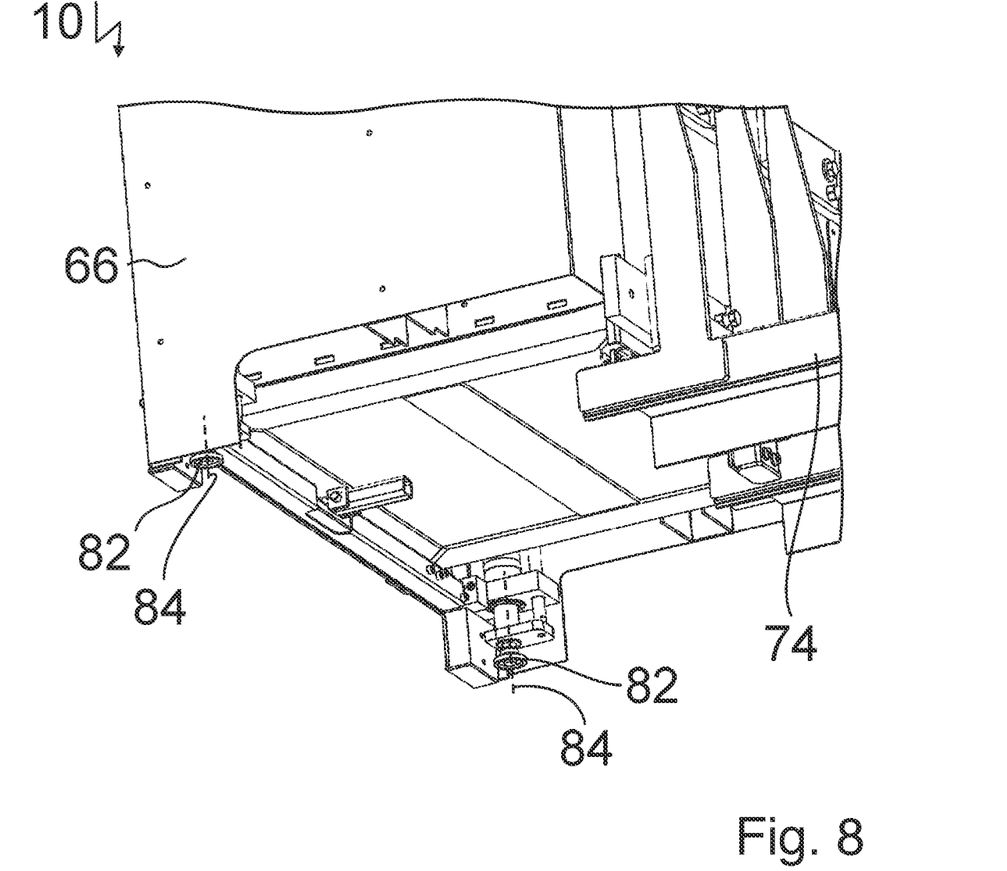
FIG. 8 is a schematic bottom view of the base housing of the handling device according to FIG. 4 with support feet in the release position.

As can be seen in particular in FIG. 8, two support feet 82 are provided on the base housing 66. The support feet 82 can each be moved along a securing axis 84 into a lower support position and an upper release position. The locking axis 84 extends parallel to the support axis 12. The position shown in FIG. 8 shows the support feet 82 in the release position, with the support feet 82 not touching the ground. In the release position, the handling device 10 can be moved, for example, by means of an industrial truck. In the lower support position, the handling device 10 stands on the support feet 82 so that the load acting on the handling device 10 is guided into the ground via the support feet 82. The support position ensures that the handling device 10 is stable on the floor. A controller 86 is provided in the base housing 66, which controller is designed in such a way that the support feet 82 move into the lower support position when the locking portion 58 is released from the locking apparatus 56 and the support feet 82 move into the upper release position when the locking portion 58 is fixed in the locking apparatus 56.

The invention claimed is:

1. A handling device comprising:
a support which extends along a vertical support axis;
a first projection element which is arranged at one end of the support in a rotationally fixed and non-displaceable manner and extends in a first projection plane transversely to the support in a first projection direction;
a second projection element which is connected to the first projection element via a first joint in such a way that the second projection element is pivotable in a second projection plane;
a third projection element which is connected to the second projection element via a second joint in such a way that the third projection element is pivotable in a third projection plane; and
an attachment portion for coupling a lifting and/or gripping device is provided on the third projection element, wherein,
along the support axis, the first projection plane overlies the second projection plane and the second projection plane overlies the third projection plane,
the second projection element can be pivoted under the first projection element and the third projection element can be pivoted under the second projection element and the first projection element,
the support is designed as a column which extends along the support axis and is height-adjustable and, telescopic,
a locking apparatus is provided on the support and/or on the first projection element, the third projection element has a locking portion,
the locking apparatus and the locking portion are designed to be coordinated with one another in such a way that the locking portion can be fixed in the locking apparatus, as a result of which a defined idle configuration for the second projection element and the third projection element is defined, and
the locking portion can only be inserted laterally into the locking apparatus by a rotational movement about an axis of rotation parallel to the support axis.

2. The handling device according to claim 1, wherein the attachment portion and/or the locking portion is arranged on an end portion of the third projection element.

3. The handling device according to claim 1, wherein the sum of a second length of the second projection element and a third length of the third projection element is greater than a first length of the first projection element and wherein, in the idle configuration, the second joint is laterally adjacent to the first projection direction.

4. The handling device according to claim 1, wherein, in the first projection direction, the first projection element is longer than the second projection element and/or the third projection element, and wherein the third projection element is longer than the second projection element.

5. The handling device according to claim 1, wherein the attachment portion and/or the locking portion of the third projection element is offset upward along the support axis, wherein a distance between the second joint and the attachment portion and/or the locking portion is greater than or equal to the second length of the second projection element.

6. The handling device according to claim 1, further comprising:
a base housing having a central longitudinal axis that extends parallel to the first projection direction; and
a transverse axis that extends orthogonally to the central longitudinal axis and parallel to the first projection plane, wherein
the support is arranged eccentrically with respect to the central longitudinal axis on the base housing.

7. The handling device according to claim 6, wherein the locking apparatus is arranged on a side of the support and/or of the first projection element, which side faces the central longitudinal axis.

8. The handling device according to claim 6, wherein the locking apparatus is designed such that the locking portion can be fixed in the locking apparatus along a movement path originating from the central longitudinal axis.

9. The handling device according to claim 6, wherein the base housing has at least one tine receptacle for a tine of a fork of an industrial truck, so that the industrial truck can drive under the base housing and the tines can be inserted into the tine receptacle.

10. The handling device according to claim 6, wherein an energy source is provided in the base housing, which energy source is designed as a replaceable and/or rechargeable trough battery.

11. The handling device according to claim 6, wherein a vacuum pump is provided in the base housing, and wherein the support, the first projection element, the second projection element, and/or the third projection element have channels for conveying media and/or data between the vacuum pump and the attachment portion.

12. The handling device according to claim 6, wherein at least one support foot is provided at the base housing, which support foot can be adjusted parallel to the support axis into a lower support position and into an upper release position.

13. The handling device according to claim 12, wherein the at least one support foot is designed in such a way that the at least one support foot moves into the release position when the locking portion is fixed in the locking apparatus, and wherein the at least one support foot is designed in such a way that the at least one support foot moves into the support position when the locking portion is released from the locking apparatus.

14. The handling device according to claim 1, comprising a lifting and/or gripping device which is coupled to the attachment portion of the third projection element.

* * * * *